Sheet 1.
2 Sheets

D. M. Swartz.
Harvester Dropper.

Nº 67929. Patented Aug. 20, 1867.

Witnesses.

Inventor.
Daniel M. Swartz,
By his atty

Sheet 2.
2 Sheets.

D. M. Swartz.
Harvester Dropper.

N° 67929  Patented Aug. 20, 1867.

Witnesses.

Inventor.
Daniel M. Swartz,
By his atty.

United States Patent Office.

DANIEL M. SWARTZ, OF LEWISBURG, PENNSYLVANIA.

Letters Patent No. 67,929, dated August 20, 1867.

---

IMPROVEMENT IN DUMPING-PLATFORMS FOR HARVESTERS.

---

*The Schedule referred to in these Letters Patent and making part of the same.*

---

TO ALL WHOM IT MAY CONCERN:

Be it known that I, DANIEL M. SWARTZ, of Lewisburg, in the county of Union, and State of Pennsylvania, have invented an improved Harvester Dumping-Platform; and I do hereby declare that the following is a full and exact description thereof, reference being had to the accompanying drawings, making part of this specification—

Figure 1:
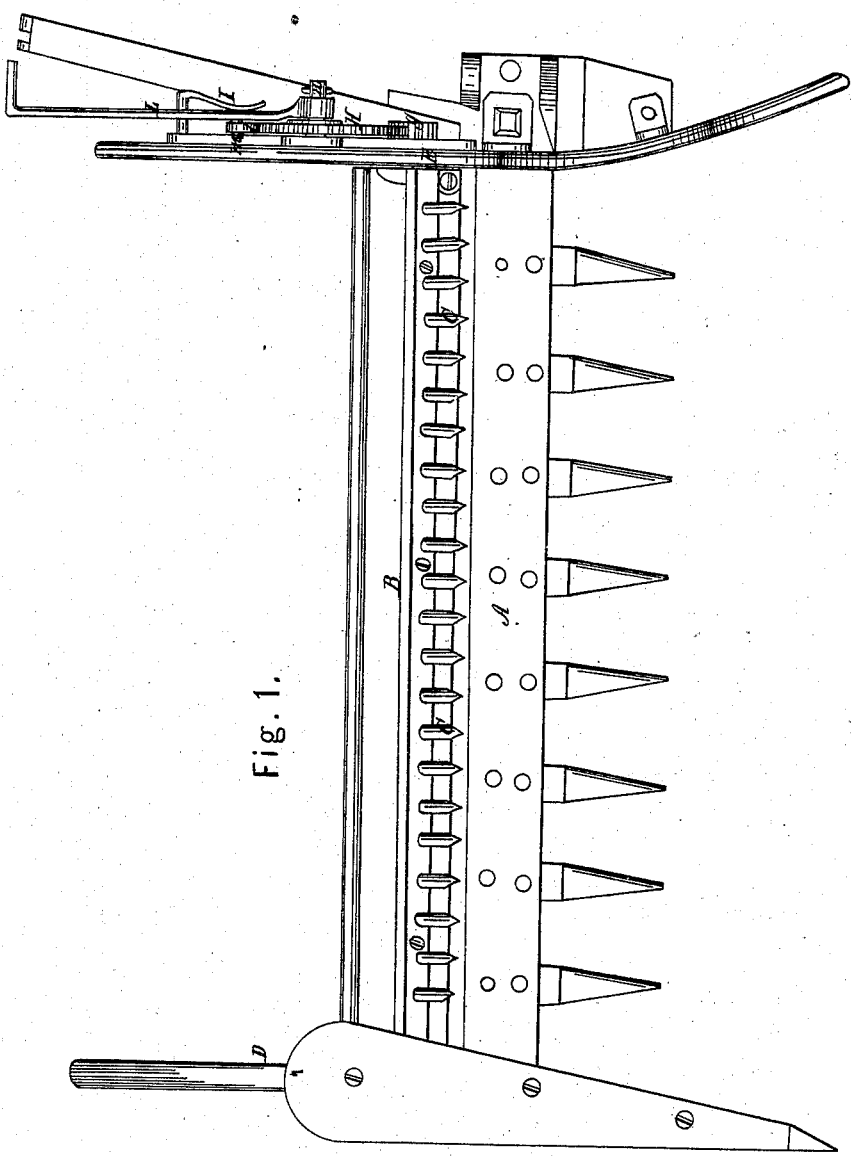

Figure 1 being a plan of my improved platform with its connecting parts applied to the cutter-bar of a harvester.

Figure 2:
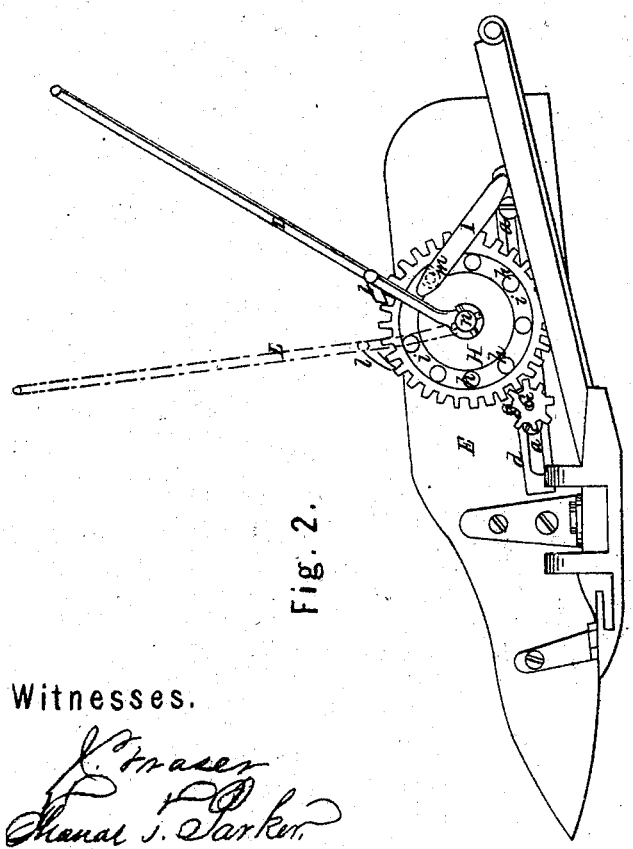

Figure 2, a side elevation thereof.

Figure 3:
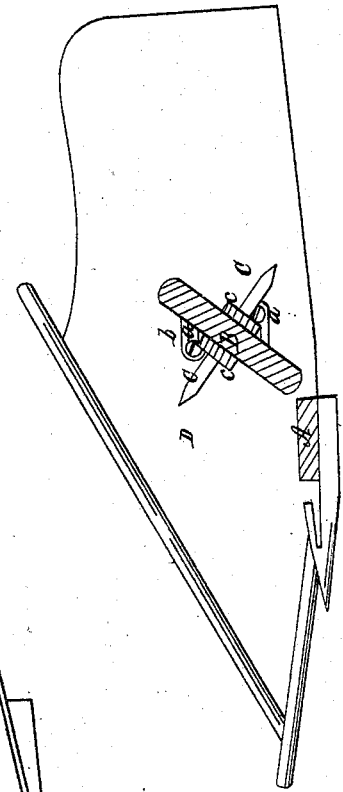

Figure 3, a transverse vertical section of the platform and cutter-bar.

Like letters designate corresponding parts in all of the figures.

The leading feature of my invention is the employment of a supporting-platform behind the cutter-bar, said supporting-platform having an intermittent revolving movement given to its upper surface in the direction opposite to the motion of the harvester itself, and being provided with rake-teeth for the purpose of carrying over the grain and depositing it in bunches on the ground.

Let A represent the cutter-bar of a harvester. Behind this is located my supporting-platform B, its position when at rest being inclined forward, about as represented in fig. 2, so that its forward edge shall be near to and at about the same height as the rear edge of the cutter-bar. It has journals G G centrally at its ends, which have bearings in or on the shoes D E of the harvester, through the latter of which one extends and projects far enough to receive a pinion, $g$, into which gears a cog-wheel, H, by which the movements are given to the supporting-platform, being communicated by a lever, L, concentric with the cog-wheel, and operated either by hand, by foot, or through suitable connections automatically by the machinery of the harvester. In the face of the cog-wheel H is a set of concentric equidistant holes, $h\ h$, connected by a circular groove, $i$, into which a pin, $m$, of a pawl, I, enters, and holds the platform successively in the proper position, as shown, after each half revolution. The groove $i$ guides the pawl-pin from hole to hole $h$ without failure. The lever L has a catch, $l$, which takes into the teeth of the cog-wheel H, which thus serves the additional purpose of a ratchet-wheel. The forward end of the spring-pawl I turns outward somewhat, as shown in fig. 1, so that as the lever is brought back it enters behind the pawl, and by a wedge action draws the pawl-pin from its hole $h$, leaving the wheel H free to turn. The lever L is then moved forward, thereby causing the platform B to revolve in the opposite direction to that of the motion of the harvester, as relates to its upper surface, till the pawl-pin $m$ springs into the next hole, $h$, and the platform has made just half a revolution, placing it in the same position as before, but the other side up, both sides being alike. The platform B has rake-teeth C C projecting from both sides, near or on the central line. These platform-teeth project far enough to give them about the same sweep as the edges of the platform. They are either driven into or through the platform, or are inserted into separate strips, $c\ c$, which are secured to the platform. This construction contemplates a flat or wide and thin platform, substantially as shown, though this form is not essential. This semi-revolution of the platform backward, whenever sufficient grain has accumulated on it to make a bunch, instantly draws the grain backward away from the cutter-bar, and deposits it evenly on the ground, the front side of the platform, as it goes upward and backward, finally striking the butts of the straw and evening them. Then the under side coming up into the same position, the platform is ready to proceed as before. The inclined position of the platform causes the grain to rest sufficiently high over the stubble not to drag off. It should be wide enough not to allow the grain to fall over till the platform turns. While the grain is falling on the platform the butts rest on the cutter-bar A, and the position of the forward edge of the platform B determines the amount of grain that will rest thereon, and the size of the gavels or bundles. By adjusting the platform forward the bundles are made smaller, and *vice versa*. The platform is adjusted by having the bearings $b\ b$ of its journals adjustable by slots $d\ d$ and screws $a\ a$, or equivalent means.

This revolving platform is not to be confounded with tilting-platforms which simply let the grain down behind the cutter-bar. My platform rakes the grain away and over backward from the cutter-bar.

What I claim as my invention, and desire to secure by Letters Patent, is—

A dumping-platform, B, revolving intermittingly backward from the motion of the harvester, and provided with one or more rows of teeth, C C, substantially as and for the purpose herein specified.

I also claim the cog and ratchet-wheel H, provided with the holes $h\ h$, and groove $i$, in combination with the spring-pawl I, and operating-lever L, substantially as and for the purpose herein described.

I also claim the combination of the revolving platform B, ratchet-wheel H, spring-pawl I, and lever L, substantially as and for the purpose herein specified.

The above specification of my improved revolving platform for harvesters signed by me this      day of January, 1867.

DANIEL M. SWARTZ.

Witnesses:
 JNO. RANDOLPH,
 S. D. BATES.